United States Patent
Daikokuya et al.

(10) Patent No.: US 7,590,884 B2
(45) Date of Patent: Sep. 15, 2009

(54) STORAGE SYSTEM, STORAGE CONTROL DEVICE, AND STORAGE CONTROL METHOD DETECTING READ ERROR RESPONSE AND PERFORMING RETRY READ ACCESS TO DETERMINE WHETHER RESPONSE INCLUDES AN ERROR OR IS VALID

(75) Inventors: Hidejirou Daikokuya, Kawasaki (JP); Hideo Takahashi, Kawasaki (JP); Yoshihito Konta, Kawasaki (JP); Yasutake Sato, Kawasaki (JP); Hiroaki Sato, Kawasaki (JP); Norihide Kubota, Kawasaki (JP); Masami Ikeno, Kahoku (JP); Tadashi Hirano, Kahoku (JP); Tsuyoshi Nakagami, Kahoku (JP); Yuuji Noda, Kahoku (JP); Yusuke Inai, Kawasaki (JP); Naoyoshi Toshine, Kawasaki (JP); Mikio Ito, Kawasaki (JP); Kazuhiko Ikeuchi, Kawasaki (JP); Yukihiro Yoshiya, Kawasaki (JP); Nobuyuki Kikuchi, Kawasaki (JP); Masaru Shimmitsu, Kawasaki (JP); Eisaku Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 512 days.

(21) Appl. No.: 11/237,662

(22) Filed: Sep. 29, 2005

(65) Prior Publication Data
US 2007/0002482 A1  Jan. 4, 2007

(30) Foreign Application Priority Data
Jun. 30, 2005   (JP)   .............................. 2005-191641

(51) Int. Cl.
*G06F 11/00* (2006.01)
*G06F 11/26* (2006.01)

(52) U.S. Cl. .................... 714/8; 714/5; 714/6; 714/54; 711/118; 711/138

(58) Field of Classification Search ............... 714/1–57; 711/118, 138
See application file for complete search history.

(56) References Cited

U.S. PATENT DOCUMENTS 4,420,807 A * 12/1983 Nolta et al. ................. 711/115

(Continued)

FOREIGN PATENT DOCUMENTS

JP    2000-293318    10/2000

(Continued)

OTHER PUBLICATIONS

"SCSI-2 detailed comment", dated Aug. 15, 1994.

(Continued)

*Primary Examiner*—Scott T Baderman
*Assistant Examiner*—Joseph Schell
(74) *Attorney, Agent, or Firm*—Staas & Halsey LLP

(57) ABSTRACT

In a storage system, a disk device performs recovery and transfers read data to a control device, and the control device judges the validity of the recovery to prevent a transfer of erroneous data. A control device read-accesses a disk device, and the disk device returns read data and a recovered read error response. A control device, at the time of an initial recovered read error, performs a retry of a similar command, and if an error does not occur for read commands including the retry read command, judges the data to be valid. Uncertain data (suspect data) upon occurrence of a recovered read error is restored through disk retry, and accurate read data can be transferred to the host.

19 Claims, 12 Drawing Sheets

U.S. PATENT DOCUMENTS

| | | | | |
|---|---|---|---|---|
| 4,667,288 A | * | 5/1987 | Keeley et al. | 714/25 |
| 4,686,621 A | * | 8/1987 | Keeley et al. | 714/40 |
| 5,355,471 A | * | 10/1994 | Weight | 714/10 |
| 5,592,616 A | * | 1/1997 | Finch et al. | 714/42 |
| 5,615,335 A | * | 3/1997 | Onffroy et al. | 714/30 |
| 5,768,494 A | * | 6/1998 | Takeishi | 714/17 |
| 5,835,704 A | * | 11/1998 | Li et al. | 714/42 |
| 5,912,906 A | * | 6/1999 | Wu et al. | 714/763 |
| 5,975,738 A | * | 11/1999 | DeKoning et al. | 700/79 |
| 6,732,234 B1 | * | 5/2004 | Rowlands et al. | 711/117 |
| 7,051,156 B2 | * | 5/2006 | Shang | 711/114 |
| 7,281,160 B2 | * | 10/2007 | Stewart | 714/8 |
| 7,321,986 B2 | * | 1/2008 | Ash et al. | 714/10 |
| 2007/0300101 A1 | * | 12/2007 | Stewart | 714/8 |

FOREIGN PATENT DOCUMENTS

| | | |
|---|---|---|
| JP | 2002-42303 | 2/2002 |
| JP | 2003-22626 | 1/2003 |
| JP | 2004-265311 | 9/2004 |

OTHER PUBLICATIONS

Japanese Office Action issued on Apr. 14, 2009 in corresponding Japanese Patent Application 2005-191641.

* cited by examiner

| BYTE\BIT | 7 | 6 | 5 | 4 | 3 | 2 | 1 | 0 |
|---|---|---|---|---|---|---|---|---|
| 0 | 28h (OPERATION CODE) ||||||||
| 1 | LUN ||| DPO | FUA | Reserved || RelAdr |
| 2 | (MSB) |||||||  |
| 3 | LOGIC BLOCK ADDRESS ||||||||
| 4 |  ||||||||
| 5 |  ||||||| (LSB) |
| 6 | Reserved ||||||||
| 7 | (MSB) TRANSFER DATA LENGTH ||||||||
| 8 |  ||||||| (LSB) |
| 9 | CONTROL BYTE ||||||||

FIG. 7
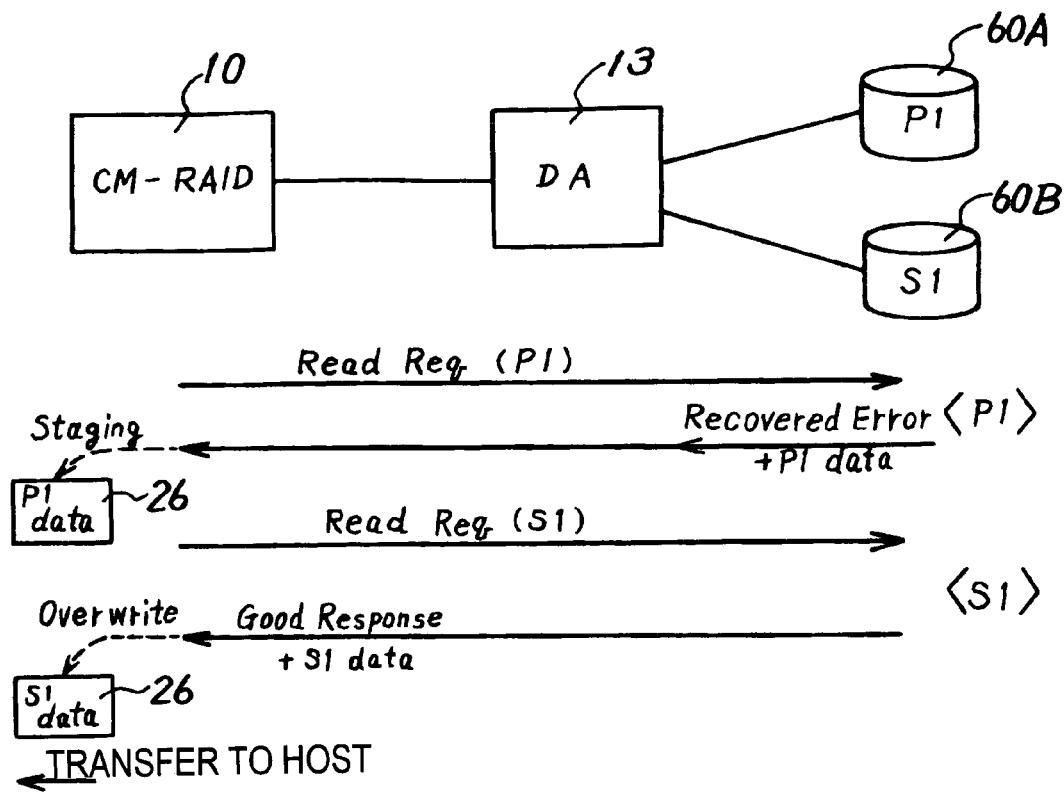
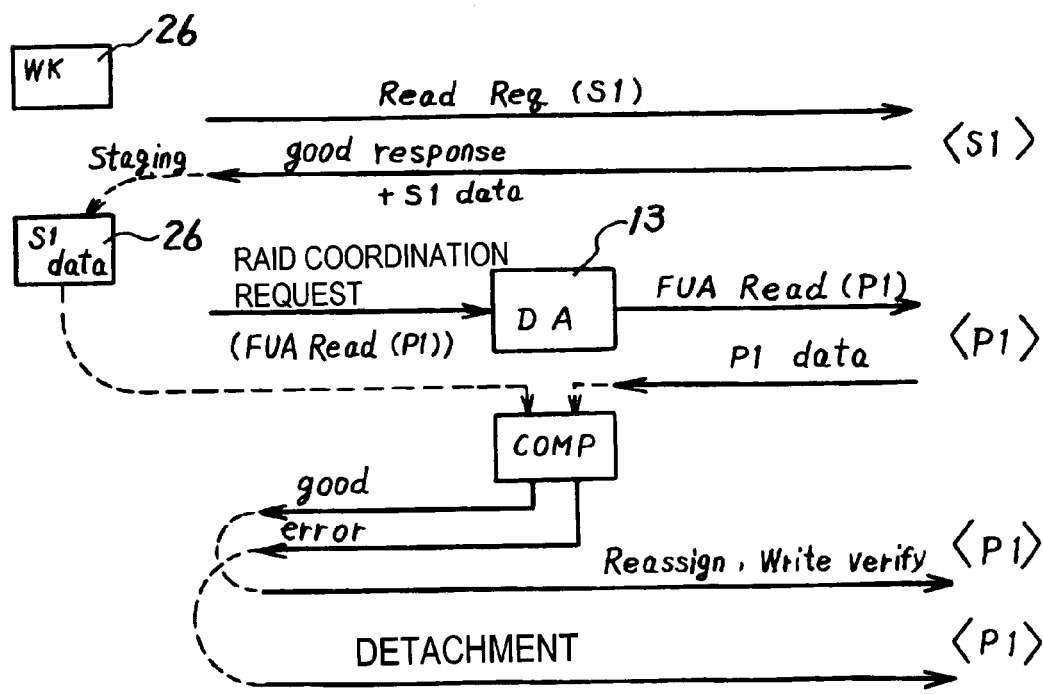

STORAGE SYSTEM, STORAGE CONTROL DEVICE, AND STORAGE CONTROL METHOD DETECTING READ ERROR RESPONSE AND PERFORMING RETRY READ ACCESS TO DETERMINE WHETHER RESPONSE INCLUDES AN ERROR OR IS VALID

CROSS-REFERENCE TO RELATED APPLICATIONS

This application is based upon and claims the benefit of priority from the prior Japanese Patent Application No. 2005-191641, filed on Jun. 30, 2005, the entire contents of which are incorporated herein by reference.

BACKGROUND OF THE INVENTION

1. Field of the Invention

This invention relates to a storage system used as an external storage device in a computer system, a storage control device, and a storage control method, and in particular relates to a storage system, storage control device, and storage control method to control reading/writing of data to a plurality of disk drives.

2. Description of the Related Art

As various data has come to be processed electronically and handled by computers in recent years, storage systems capable of reliably storing huge quantities of data have come into widespread use. In such storage systems, large amounts of data are read and written through access by a host computer.

Such storage systems has numerous storage devices, and control devices which control the storage devices. In particular, compact, inexpensive hard disk drives or other disk drives capable of mass storage are utilized as the storage devices. Control devices access storage devices in which are stored data requested by a host or for internal processing, to execute data reading and writing.

In such a storage system, during read access data written to storage media of a storage device is read. That is, upon receiving a read access command, a control device determines the storage device in which the relevant data is stored, and issues a read command specifying an operation to read the relevant data.

The storage device analyzes the read command, determines the physical storage position of the data, reads the data at that position, and transfers the data to the control device. For example, in the case of a disk drive a head is positioned at the storage position of the relevant data on the storage media, and the head is used to read the data at that position.

An error check code (ECC) is appended to the data in such a storage device, the error check codes of read-out data are checked, and the validity of the read operation is judged. If the error check result is satisfactory and the read operation is accurate, the read-out data is transferred to the control device. And when error correction is possible, error correction is performed, and the error-corrected data is transferred.

On the other hand, when errors are detected in read-out data and correction is not possible, the data at the physical position on the storage media is once again read out (in a "retry" operation), and error checking and error correction are similarly performed. When the read operation is satisfactory, the data is similarly transferred. That is, the specified data on the media is not necessarily read out satisfactorily at only once read-out operation. In order to transfer this fact to the control device, in for example a SCSI (Small Computer System Interface) system, when in a single read operation the read operation is accurate, "good" is reported to the control device as the status, and when the read operation is recovered by the retry operation, "recovered error" is reported as the status (see for example "SCSI-2 Shousai Kaisetsu, CQ Publishing, issued Aug. 1 1995, pp. 170-172).

In the technology of the prior art, a control device treats both a "good" response and a "recovered error" response to a read request sent to a storage device (disk drive) as a normal result. The "recovered error" status is returned in cases other than when an error is not detected in a single read operation, that is, in case when data can be read during retries within a disk drive, or similar.

However, upon a recovered error response, there is the possibility that data different from previous written data may be read and transferred; and so there is the problem that the reliability of read data upon a recovered error response is low compared with read data for a good response.

For example, a write operation resulting from a write command normally overwrites the previous data with the current write data, without erasing the area of the physical position on the storage media. As a result, erase and verify are not performed, and so write speeds are improved.

In particular, in a disk drive a head is positioned at the specified physical position to perform read/write operations, so that there exists some degree of shift in read and write positions upon each read and write operation. Consequently, when writing data the previously written data is not always completely overwritten by the data of the current write operation, even when the head position in the previous write operation and in the current write operation is within the allowable range. Further, depending on the write position, adjacent tracks may exert an effect, and it is possible that during reading the written data cannot be accurately read.

In such cases, when during the next read operation reading cannot be performed in a single operation, ordinarily the head is shifted by an offset and retry reading is performed. Or, when error checking for one read operation results in error detection, and error correction is possible, the error is corrected, and the error-corrected data is transferred.

When error correction is not possible, a retry operation is performed, the head is once again positioned, data is read from the storage media, error checking is performed, and when no error is detected, or when an error is detected but error correction is possible, the resulting read-out data is transferred.

Even when such a read error is detected, recovery is possible through a retry or error correction, and data is transferred; but as explained above, due to the effect of data in adjacent tracks and incomplete overwriting, such read-out data may be different from the data which was written. Such phenomena are very rare and transient, but their effect is substantial in control devices which process read-out data.

SUMMARY OF THE INVENTION

Hence an object of this invention is to provide a storage system, storage control device, and storage control method to improve the reliability of read data in the event of a recovered read error response.

A further object of this invention is to provide a storage system, storage control device, and storage control method to judge the validity of read data in the event of a recovered read error response.

A further object of this invention is to provide a storage system, storage control device, and storage control method to detect anomalies in read data in the event of a recovered read error response.

A further object of this invention is to provide a storage system, storage control device, and storage control method to detect read data anomalies, and to prevent the repeated occurrence of recovered read errors in the event of a recovered read error response.

In order to achieve the above objects, a storage system of this invention has at least one disk device and a control unit which performs reading and writing of data from and to the disk device according to requests from a higher-level apparatus. And the control unit has cache memory to store data of the disk device, and a processing unit which read-accesses the disk device and receives read data and a response result from the disk device. The processing unit, when a response upon receiving read data is a recovered read error response, performs retry read access of the disk device for the same data, discriminates whether an error is included in the response from the disk device of the retry read access, and judges data read by the retry read access to be valid.

Further, a storage control device of this invention performs data reading/writing from and to at least one disk device according to requests from a higher-level apparatus, and has cache memory which stores data of the disk device and a processing unit which accesses the disk device and receives read data and a response result from the disk device. And the processing unit performs retry read access of the same data in the disk device when the response upon receiving read data is a recovered read error response, discriminates that the response from the disk device of the retry read access does not comprise an error, and judges the read data resulting from the retry read access to be valid.

A storage control method of this invention performs data reading/writing from and to at least one disk device according to requests from a higher-level apparatus, and has a step of read-accessing the disk device and receiving the read data and a response result from the disk device; a step, when the response upon receiving the read data is a recovered read error response, of performing retry read access of the same data in the disk device; and a step of discriminating that the response from the disk device of the retry read access does not comprise an error, and of judging the read data resulting from the retry read access to be valid.

In this invention it is preferable that the processing unit, after executing retry read access, perform read access of the disk device with usage of the cache memory of the disk device disabled, receive the read data, compare the read data with the read data at the time of the recovered read response, and execute diagnostics of the disk device.

Further, in this invention it is preferable that the disk device comprise a plurality of disk devices configured as a redundant system, and that the processing unit, according as the response of read access of one disk device is a recovered read error response, performs retry read access of the same data in another disk device constituting the redundant system.

Further, in this invention it is preferable that the processing unit judge that read data obtained by retry read access of another disk device constituting the redundant system not comprise an error response, judge the read data obtained by the retry read access to be valid, and transfer the data to an external apparatus.

Further, in this invention it is preferable that the processing unit, after execution of the retry read access, perform read access of the disk device with usage of the cache memory of the disk device disabled, receive the read data, compare the read data with the read data from the other disk device, and execute diagnostics of the disk device.

Further, in this invention it is preferable that, when the comparison result is satisfactory, the processing unit execute replacement processing of the relevant area of the one disk device.

Further, in this invention it is preferable that, when the comparison result is not satisfactory, the processing unit execute detachment processing of the one disk device.

Further, in this invention it is preferable that, in response to a recovered read error response, the processing unit perform retry read access of the same data in the disk device which had been read-accessed with usage of the cache memory disabled, discriminate that the response from the retry read access disk device does not comprise an error, and judge the data read out by the retry read access to be valid.

Further, in this invention it is preferable that, in response to repeated reception of recovered read error responses from the disk device of retry read access, the processing unit repeatedly perform retry read access of the same data on the disk device which had been read-accessed with usage of the cache memory disabled, discriminate that an error is not included, compare the read data with the read data at the time of a recovered read error, and execute diagnostics of the disk device.

Further, in this invention it is preferable that, when the comparison result is satisfactory, the processing unit executes replacement processing of the relevant area of the disk device, and transfer the read data to an external apparatus.

Further, in this invention it is preferable that, when the comparison result is not satisfactory, the processing unit executes replacement processing of the relevant area of the disk device, and also notify the external apparatus of an error.

In this invention, at the time of a first recovered read error, a retry is performed using a similar command, and when an error does not occur as a result of the read commands, including the retry, the data is judged to be correct. Consequently uncertain data (suspect data) obtained at the time of a recovered read error can be recovered through a disk retry, and accurate read data can be transferred to the host or similar.

BRIEF DESCRIPTION OF THE DRAWINGS

FIG. 7 explains read access operation in the first embodiment of the invention;

DESCRIPTION OF THE PREFERRED EMBODIMENTS

Below, embodiments of the invention are explained in the order of a storage system, first embodiment of read processing, second embodiment of read processing, and other embodiments. However, this invention is not limited to these embodiments, and various modifications are possible.

Storage System

Figure 1:
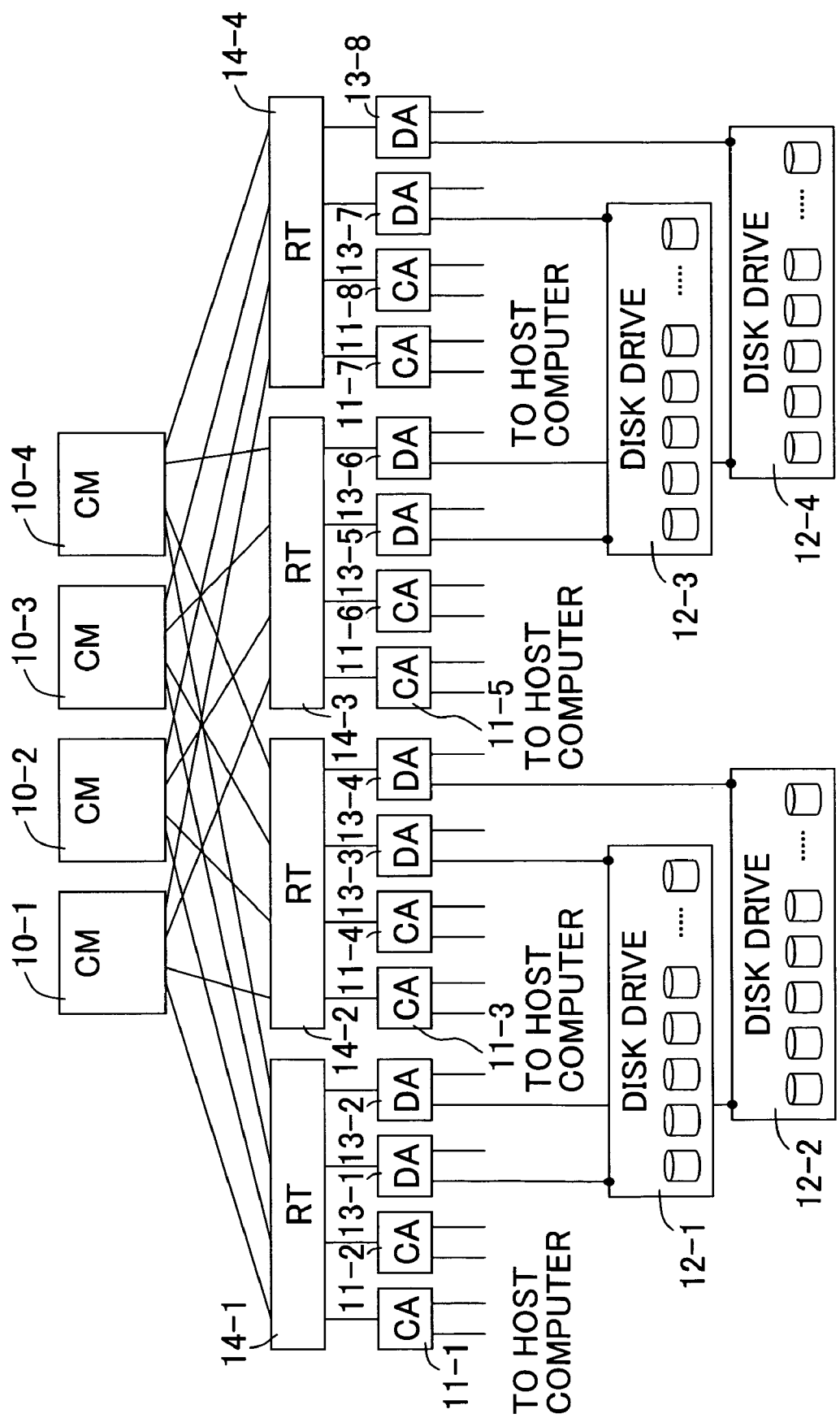
FIG. 1 is a block diagram showing the configuration of the storage system of an embodiment of the invention.
Figure 2:
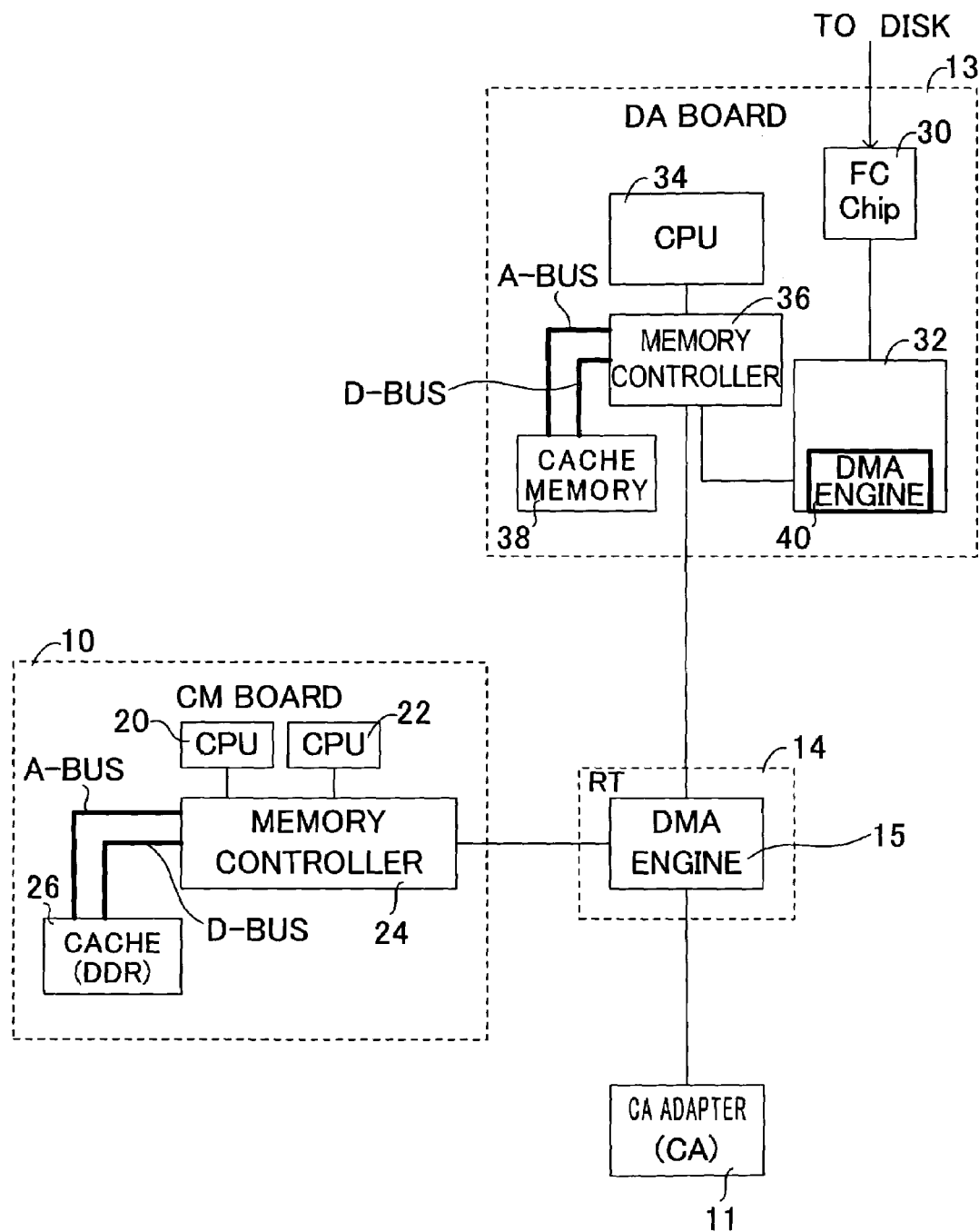
FIG. 2 is a block diagram showing the configuration of the control module in the embodiment of FIG. 1.
Figures 3, 4:
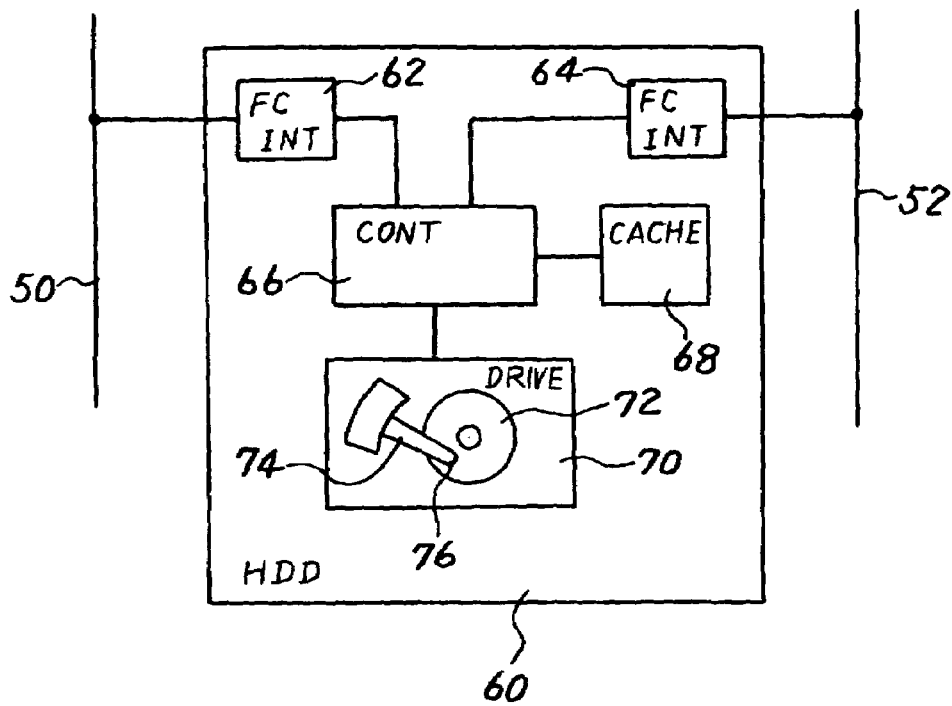
FIG. 3 is a diagram of the configuration of a disk drive in FIG. 1.
FIG. 4 explains the format of a read command in FIG. 1.

FIG. 1 shows the overall configuration of one embodiment of a storage system of this invention; FIG. 2 shows the detailed configuration of the principal portions in FIG. 1; FIG. 3 shows the configuration of a disk drive in FIG. 1; and FIG. 4 shows the format of a read command.

As shown in FIG. 1, the storage system comprises, as the principal units, cache managers ("CM" in the drawing) 10-1 to 10-4, each comprising cache memory and a cache control unit; channel adapters ("CA" in the drawing) 11-1 to 11-8, which are interfaces with host computers (not shown); 25 disk enclosures 12-1 to 12-4, each comprising a plurality of disk drives; and device adapters ("DA" in the drawing) 13-1 to 13-8, which are interfaces with the disk enclosures 12-1 to 12-4.

In addition, routers ("RT" in the drawing) 14-1 to 14-4, which interconnect the cache managers 10-1 to 10-4, channel adapters 11-1 to 11-8, and device adapters 13-1 to 13-8, and which transfer data and enable communication between these principal units, are also comprised.

This storage system is provided with four cache managers 10-1 to 10-4, as well as four routers 14-1 to 14-4 corresponding to the cache managers 10-1 to 10-4. Each of the cache managers 10-1 to 10-4 is connected one-to-one to each of the routers 14-1 to 14-4. By this means, connections between the plurality of cache managers 10-1 to 10-4 are made redundant, and availability is improved. That is, even when one router 14-1 malfunctions, by passing through the other routers 14-2, 14-3, 14-4, connections with the plurality of cache managers 10-1 to 10-4 can be secured, so that even in such a case the storage system can continue normal operation.

In this storage system, two of the channel adapters 11-1 to 11-8 and two of the device adapters 13-1 to 13-8 are connected to each of the routers 14-1 to 14-4. Hence the storage system comprises a total of eight channel adapters 11-1 to 11-8 and a total of eight device adapters 13-1 to 13-8. These channel adapters 11-1 to 11-8 and device adapters 13-1 to 13-8 can communicate with all of the cache managers 10-1 to 10-4 by means of the interconnections between the cache managers 10-1 to 10-4 and the routers 14-1 to 14-4.

These channel adapters 11-1 to 11-4 are for example connected by Fibre Channel and Ethernet (a registered trademark) to host computers (not shown) which process data held on a plurality of disks. Also, the device adapters 13-1 to 13-8 are for example connected by Fibre Channel to each of the disk drives in the disk enclosures 12.

In addition to user data from a host computer, various information is exchanged between the channel adapters 11-1 to 11-8 and the cache managers 10-1 to 10-4, and between the device adapters 13-1 to 13-8 and the cache managers 10-1 to 10-4, in order to secure consistency of internal operation of the disk array equipment (for example, mirroring of data between a plurality of cache memory units).

Hence the cache managers 10-1 to 10-4, channel adapters 11-1 to 11-8, and device adapters 13-1 to 13-8 are connected to the routers 14-1 to 14-4 via an interface capable of a lower latency (faster response time) than the interfaces with the disk array equipment and host computers and with disk devices. For example, a bus such as a PCI (Peripheral Component Interconnect) bus is used, designed for connection of LSI (Large-Scale Integration) devices with print boards.

Further, the disk enclosures 12-1 to 12-4 each have two Fibre Channel ports, and each port is connected to a device adapter 13-1 to 13-8 placed under a different router 14-1 to 14-4. By this means, when there is a malfunction in a device adapter 13-1 to 13-8, or a malfunction in a router 14-1 to 14-4, the connection with the cache managers 10-1 to 10-4 is not broken.

By incorporating ordinary cache memory, this storage system can reduce the time for data access. And, RAID technology can also be adopted. For example, the same data can be stored on a plurality of disks (RAID-1), parity information can be distributed and stored on disks (RAID-5), and other techniques can be used to improve reliability. Further, many storage systems adopting techniques in which, by adding a check code to data, data integrity is further ensured and reliability is improved.

As shown in FIG. 2, the device adapters 13 (referring collectively to 13-1 to 13-8) have a Fibre Channel chip 30 for connection to a disk enclosure 12-1 (or 12-2 to 12-4), an interface circuit 32 having a DMA engine 40, a CPU 34, a memory controller 36, and cache memory 38. The CPU 34 operates the Fibre Channel chip 30 and memory controller 36, and executes disk interface control described below, as well as read/write processing with a host.

The cache manager modules 10 (referring collectively to 10-1 to 10-4) each have two CPUs 20, 22, cache memory 26, and a memory controller 24 which serves as a bridge circuit, and perform access processing described below. The routers 14 (referring collectively to 14-1 to 14-4), in addition to having switching functions, are provided with a DMA engine 15. The routers 14 are also connected to the channel adapters 11 (referring collectively to 11-1 to 11-8).

The cache memory 38, 26 comprises DDR (Double Data Rate) DRAM (Dynamic Random Access Memory); addresses are specified on the address bus A-BUS (for example 8 bits), and data is exchanged on the data bus D-BUS.

Next, operation of the storage system in the above-described configuration when data is stored (written) by a host computer is explained. Data stored in a disk by a host computer is first transmitted to a channel adapter 11. The channel adapters 11 have a configuration similar to the device adapters 13.

The channel adapter 11 writes the received data to internal memory, and upon completion of data reception from the host, starts the internal DMA engine, reads the write data (received data) in internal memory, and after adding block check codes (BCC) to the data, transfers the data to the memory controller 24 of a cache manager 10 via a router 14.

The memory controller 24, under control by the CPUs 20 and 22, stores the transferred data in the cache memory 26. Then, the DMA engine 15 is started, and the data is transferred to the memory controller 24 of another cache manager 10, as indicated in FIG. 1. By this means, mirroring is performed.

When mirroring is completed normally, the cache manager 10 notifies the channel adapter 11, and the channel adapter 11 notifies the host computer of the normal end of data storage. The cache manager 10 writes back the write data in the cache memory 26 to the magnetic disk enclosure 12-1 in FIG. 1 via a device adapter 13, following an internal sequence, to store the data in the magnetic disk enclosure 12-1.

Next, when a read request is issued by a host computer, a channel adapter 11 first receives the read request from the host computer. Then, the channel adapter 11 receiving the read request issues a request for the data of the read request to the associated cache manager 10.

If the relevant data exists within its own cache memory 26, the associated cache manager 10 notifies the channel adapter 11 and router 14 of the address in the cache memory 26 at which the relevant data is held and also instructs the DMA engine 15 of the router 14 to perform reading. As a result, the DMA engine 15 is started, and the relevant data is read from the cache memory 26 and is transferred to internal memory of the channel adapter 11. Thereafter the internal DMA engine is started, and the relevant data in internal memory is transferred to the host.

If on the other hand the relevant data does not exist in the cache memory 26 of the associated cache manager 10, a read request is issued to read the relevant data from the disk enclosure 12-1 to the device adapter 13 and transfer the data to cache memory 26. In the device adapter 13, the CPU 34 issues the read command explained in FIG. 4 to the disk enclosure 12-1 via the interface circuit 32 and FC circuit 30. The read-out data read from the disk enclosure 12-1 is stored in the cache memory 38 via the FC circuit 30, interface circuit 32, and memory controller 36. Upon receiving notification of the completion of reading from the device adapter 13, the CPUs 20 and 22 of the cache manager 10 start the DMA engine 15, write the read-out data in the cache memory 38 to the cache memory 26, and notify the cache manager 10 of the completion of writing of the relevant data.

Further, the cache manager 10, upon receiving from the device adapter 13 notification indicating that writing of the relevant data to the cache memory 26 has ended, notifies the channel adapter 11 that the relevant data has been prepared, and instructs the router 14 to read the relevant data.

As a result, the router 14 starts the DMA engine 15, reads the relevant data in cache memory 26, and transfers the data to the channel adapter 11. The channel adapter 11 then transfers the relevant data (read-out data) to the host.

FIG. 3 shows the configuration of a disk drive within a disk enclosure 12-1 (or 12-2 to 12-4), and is explained for the example of a hard disk drive 60 (HDD). The hard disk drive 60 is connected to a pair of FC cables 50, 52 provided in the disk enclosure 12-1 (or 12-2 to 12-4). For this purpose, a pair of FC interface circuits 62, 64 are provided. The hard disk drive has magnetic disks 72; a control circuit 66 which controls the drive mechanism 70 having an actuator 74 on the tip of which is provided a magnetic head 76; and cache memory 68 to store read data and write data.

In this HDD 60 also, read-out data from a magnetic disk 72 is stored temporarily in the cache memory 68 and is transferred to a device adapter 13; and upon the next read command for the same data, the data is transferred from the cache memory 68 to the device adapter 13, without accessing the magnetic disk 72. Also, write data from the device adapter 13 is temporarily stored in the cache memory 68, and then is written to the magnetic disk 72 after notification of write completion.

FIG. 4 explains the format of a read command in the SCSI-2 system. A read command comprises ten bytes, from "0" to "9"; the 0th byte is the operation code (read operation), the first byte is the LUN (Logical Unit Number) and cache control information DPO and FUA; the second through fifth bytes are the logical block address; and the seventh and eighth bytes are the transfer data length.

Of this information, the FUA (Force Unit Access) flag specifies whether to force media access when executing the command. For example, when FUA="0", if there is a cache hit for the specified data the media is not accessed, and the data is transferred from the cache 68. When on the other hand FUA="1", the command always instructs that the media 72 be accessed; for a read command, the requested data is read from the media 72 even if there is a cache hit.

First Embodiment of Read Processing

Figure 5:
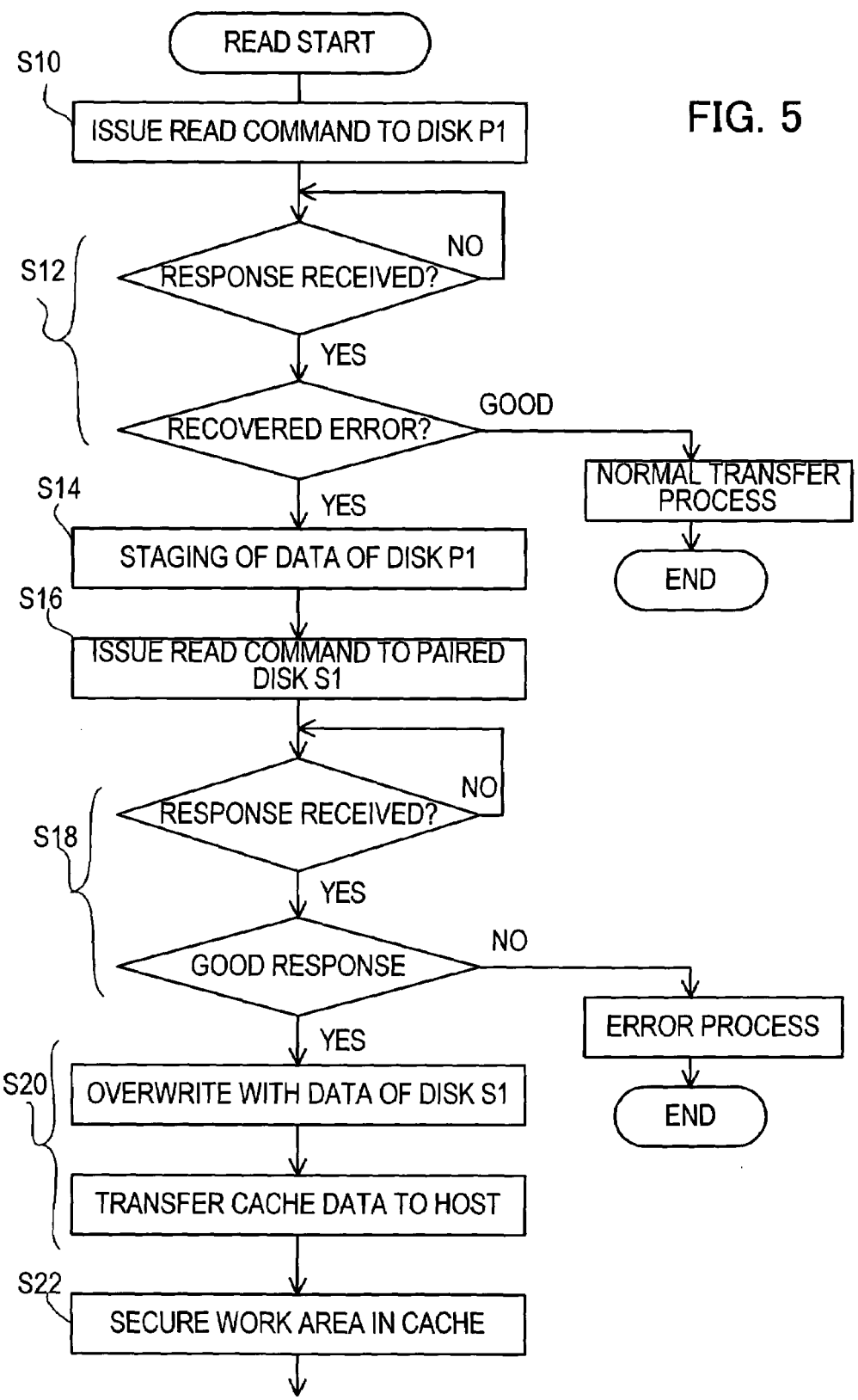
FIG. 5 is a (first) diagram of the flow of read access processing in a first embodiment of the invention.
Figure 6:
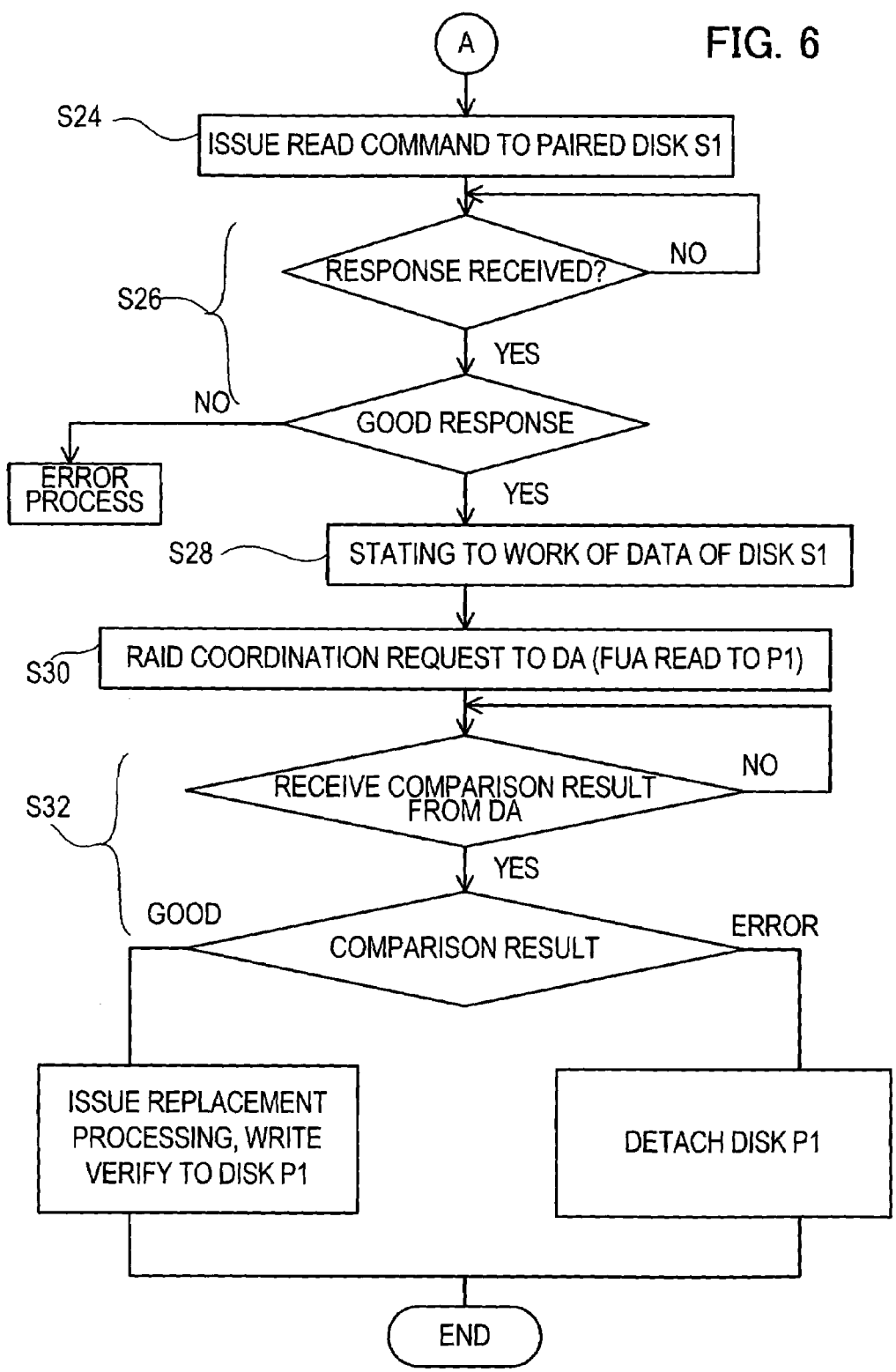
FIG. 6 is a (second) diagram of the flow of read access processing in the first embodiment of the invention.

FIG. 5 and FIG. 6 show the flow of read processing in a first embodiment of the invention, and FIG. 7 explains the read operation. As indicated in FIG. 7, this first embodiment is for read processing when there is redundancy, as for example in a RAID 1 system. That is, in this example a copy of the data on the disk 60A is stored in a paired disk 60B.

Below, FIG. 7 is used to explain read processing in a system with redundancy according to FIG. 5 and FIG. 6.

(S10) First, a cache module (hereafter "CM") 10 issues a read request to a disk 60A (P1) via the DA 13.

(S12) The CM 10 decides whether a response has been received from the disk 60A via the DA 13, and when a response has been received, decides whether "recovered read error" is included in the response. If the response is a "good" response, then as explained above, the CM 10 executes the normal transfer operation which stores the read data in the cache memory 26 and transfers the data to the host, as above described, and processing ends.

(S14) If on the other hand the CM 10 decides that the response is a recovered read error response, the CM 10 stages read data from the disk 60A in the cache memory 26.

(S16) Next, the CM 10 issues a read request (retry) to the disk 60B (S1) paired with the request disk 60A (P1), via the DA 13.

(S18) The CM 10 judges whether a response has been received from the disk 60B via the DA 13, and if a response has been received, decides whether the response is a "good" response. If not a "good" response, the response is a "recovered error" response, and so error processing is executed, and processing ends.

(S20) If on the other hand the CM 10 judges that the response is a "good" response, the CM 10 overwrites read data from the disk 60A with the read data from the disk 60B in the cache memory 26. The CM 10 then transfers the read data of the "good" response to the host.

(S22) Next, the CM 10 initiates diagnostics of the request disk 60A asynchronously with the host. First, the CM 10 secures a work area for diagnostics in the cache memory 26.

(S24) Then, the CM 10 issues another read request to the disk 60B (S1) paired with the request disk 60A (P1), via the DA 13.

(S26) The CM 10 decides whether a response has been received from disk 60B via the DA 13, and if a response has been received, decides whether the response is a "good" response. If not a "good" response, the response is a "recovered error" response, and so error processing is executed, and processing ends.

(S28) If on the other hand the CM 10 decides that the response is a "good" response, the CM 10 stores read data from disk 60B in the work area secured in the cache memory 26.

(S30) Then, the CM 10 issues a RAID coordination request (the read command for the request disk 60A has FUA="1";

the request data range is the same as in step S24) to the DA 13. As indicated in FIG. 7, in response to this coordination request the DA 13 again issues a read request to the request disk 60A (P1). At this time, as explained in FIG. 4, the FUA in the read command is set to "1" (cache disabled), so that the read data stored in the cache memory 68 for the disk 60A as a result of the read command in step S10 is ignored, and reading is performed directly from the magnetic disk 72. The DA 13 then compares the read data S1 data of the disk 60B in the work area of the cache memory 26 in the CM 10 and the read data P1 data of the disk 60A, and returns to the CM 10 a result of comparison coincidence ("good") or comparison non-coincidence ("error") as the coordination request response.

(S32) The CM 10 judges whether a response to the coordination request has been received from the DA 13, and if a response has been received, decides whether the response is a "good" response. If a "good" response, the CM 10 issues an assignment command to perform replacement processing of the area of the disk 60A, and write and verify commands for the replaced area to the disk 60A via the DA 13. The disk 60A executes the replacement processing for the area, performs the verify operation, and decides whether the replacement processing has been performed reliably. If on the other hand the response is an "error" response, the CM 10 detaches the disk 60A, and processing ends.

Thus in a RAID 1 system, when a recovered error occurs in a request disk (P1), the CM 10 immediately performs a retry on the paired disk (S1) and completes staging to the cache. By this means, uncertain (suspect) data occurring upon a recovered error is restored through a retry performed on the paired disk, and accurate read data can be transferred to the host.

Diagnostics are then performed over a request range which includes the recovered error LBA, and depending on the result, replacement processing or detachment of the request disk P1 are performed. As a result, repeated recovered error occurrences can be reduced.

These diagnostics are executed using read commands in which read processing of the request disk is performed with the cache disabled, so that the data on the request disk itself can be read directly, and diagnostics can be performed more reliably. Further, the data is compared with the read data from a paired disk, so that diagnostics of the relevant data for the request disk can be performed by simple means.

Further, prior to diagnostics accurate data is transferred to the host, so that the impact on the time responding to the host is not so great, and diagnostics can be performed asynchronously.

Figure 8:
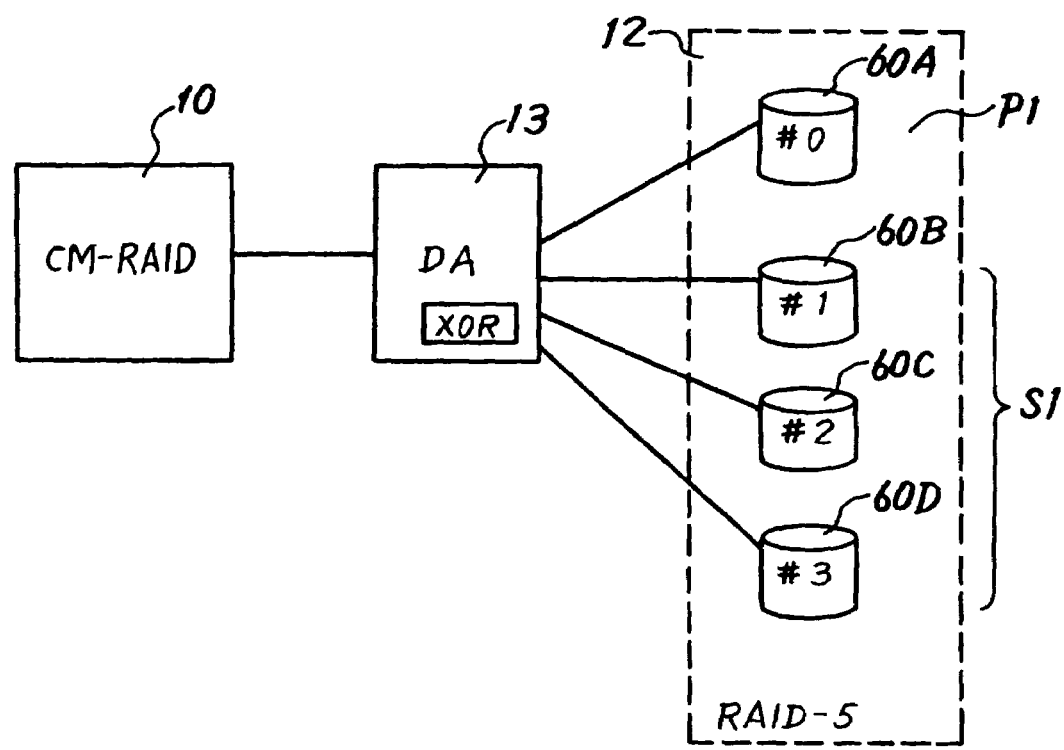
FIG. 8 is a block diagram showing the configuration of another storage system of the first embodiment of the invention.

FIG. 8 is a modified example of execution of the processing of FIG. 5 and FIG. 7 in a RAID 5 system. As shown in FIG. 8, in the RAID 5 system data is distributed and stored in four disks 60A, 60B, 60C, 60D. By designating disk 60A as disk P1 and disks 60B, 60C, 60D as disks S1, similar processing can be realized. However, in step S28 a regeneration read command is issued to the DA 13, and the DA 13 reads the data of disks 60B, 60C and 60D and perform XOR operation of these data to create data equivalent to that of disk 60A.

In this way, retry is performed upon occurrence of an initial recovered error. In a redundant system, retry is performed on a paired disk, and when no errors occur upon execution of read commands, including during retries, the data is judged to be correct. Hence uncertain data (suspect data) resulting from recovered error occurrence can be recovered through retries of paired disks, and accurate read data can be transferred to the host.

By setting the FUA to enable (rereading from the media) upon occurrence of an initial recovered error, a function is added to perform retries using similar commands (without division), and diagnostics are preformed by comparing the data with the read data from a paired disk. Only when the comparison results in coincidence is the request disk judged to be normal. However, once a recovered error has occurred, there remains the possibility that a recovered error will again occur, and so replacement processing is performed to prevent repeated recovered errors. Moreover, write verify is performed to ensure reading and writing of the replacement processed data.

If on the other hand there is not coincidence, the request disk is detached, and diagnosis and replacement of the disk itself are performed.

Second Embodiment of Read Processing

Figure 9:
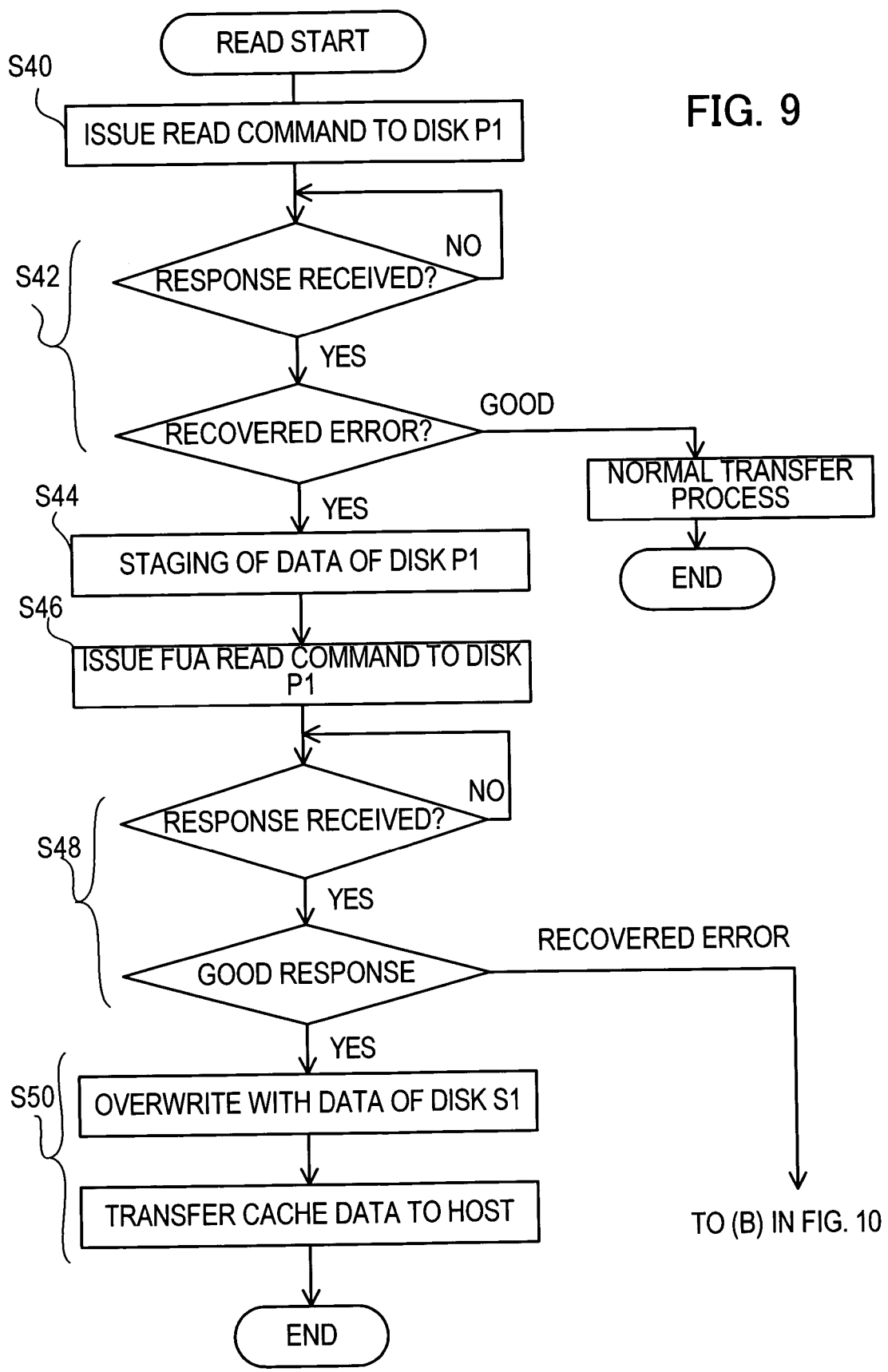
FIG. 9 is a (first) diagram of the flow of read access processing in a second embodiment of the invention.
Figure 10:
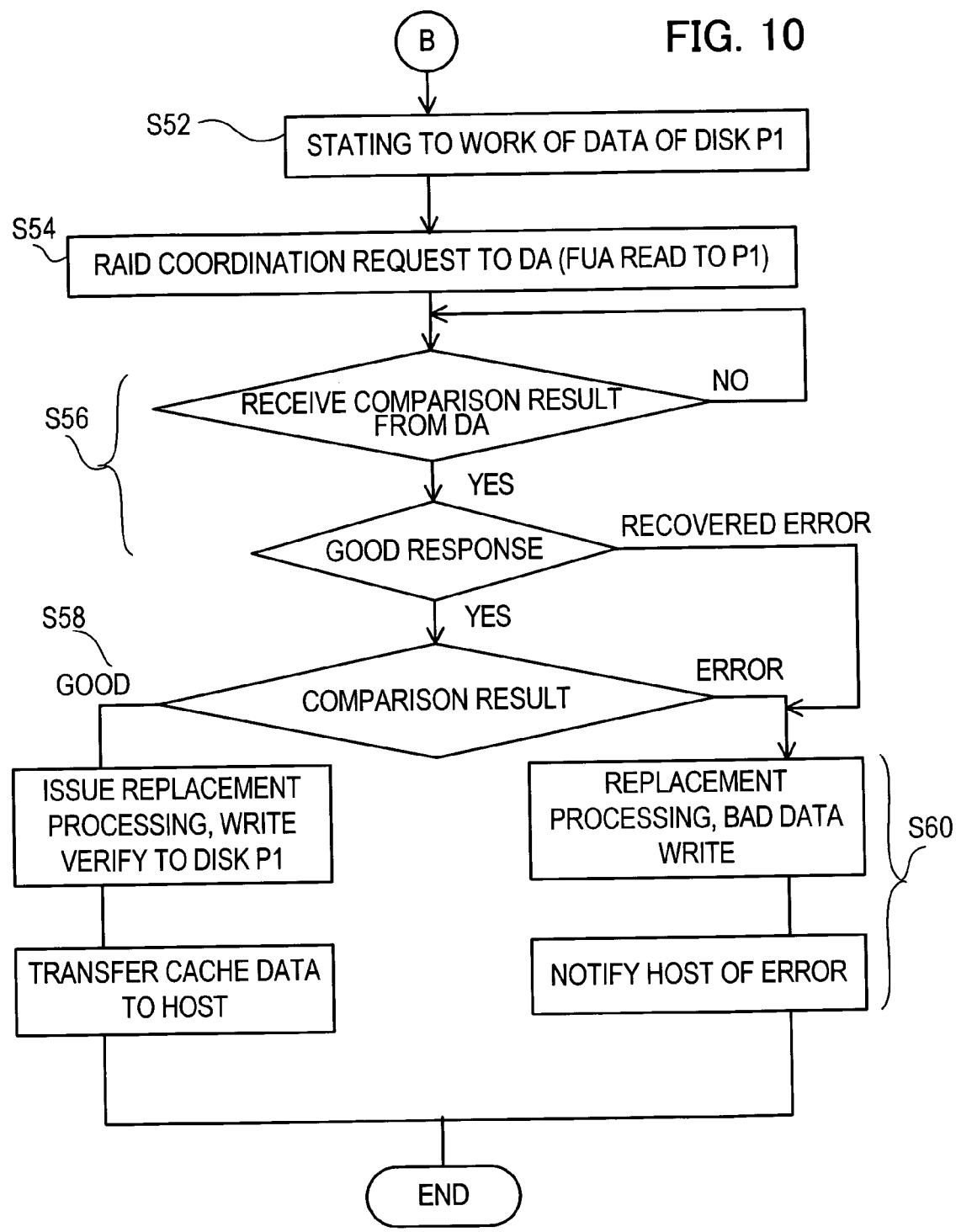
FIG. 10 is a (second) diagram of the flow of read access processing in the second embodiment of the invention.
Figure 11:
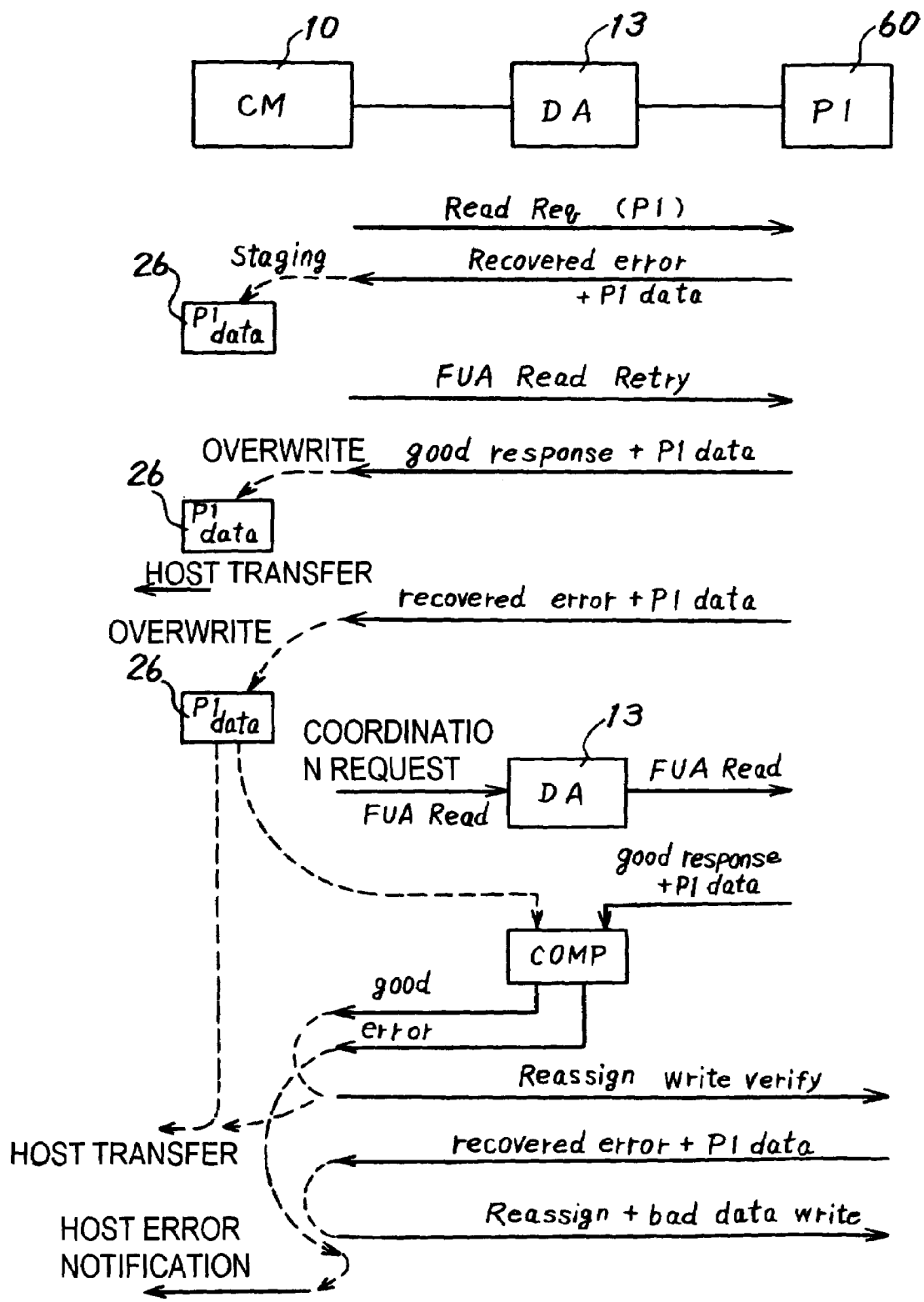
FIG. 11 explains read access operation in the second embodiment of the invention.

FIG. 9 and FIG. 10 show the flow of read access processing in a second embodiment of the invention, and FIG. 11 explains the operation in this processing. This second embodiment is of read processing for a case of a RAID 0 system with no redundancy, as indicated in FIG. 11. That is, in this example a copy of the data on the disk 60 is not stored in another disk 60.

Below, FIG. 11 is used to explain read processing in a system without redundancy according to FIG. 9 and FIG. 10.

(S40) First, a cache module (hereafter "CM") 10 issues a read request to a request disk 60 (P1) via the DA 13.

(S42) The CM 10 decides whether a response has been received from the disk 60 via the DA 13, and if a response has been received, decides whether the response contains a "recovered error". If the response is a "good" response, then as explained above, after storing the read data in the cache memory 26, a normal transfer process is executed to transfer the data to the host, and processing ends.

(S44) If on the other hand the CM 10 decides that the response is a recovered error response, the CM 10 stages read data from the disk 60 in the cache memory 26.

(S46) Next, the CM 10 issues a read request (retry) to the request disk 60 (P1) via the DA 13. The read command to the request disk 60 has FUA="1", and the request range is the same as in step S40. As explained in FIG. 4, in the disk 60 the value of FUA in the read command is "1" (cache disabled), so that in the read command of step S40, the read data from disk 60 stored in the cache memory 68 is ignored, and data is read directly from the magnetic disk 72.

(S48) The CM 10 judges whether a response has been received from disk 60 via the DA 13, and if a response has been received, decides whether the response is a "good" response. If not a "good" response, then the response is a "recovered error" response, and so processing proceeds to step S52.

(S50) If on the other hand the CM 10 judges the response to be "good", the CM 10 overwrites the read data from the disk 60 in the cache memory 26 with the read data from the disk 60. The CM 10 then transmits the read data of the "good" response to the host, and processing ends.

(S52) If in step S48 the response is judged to be "recovered error", the CM 10, in a state synchronous with the host, initiates diagnostics of the request disk 60. First, the CM 10 overwrites the previous read data in cache memory 26 with the read data from the request disk 60.

(S54) Then, the CM 10 issues a RAID coordination request (with request disk 60 read command FUA ="1", and with the request range the same as in step S40) to the DA 13. As shown in FIG. 11, in response to the coordination request the DA 13 issues a repeated read request to the request disk 60 (P1). As explained in FIG. 4, at this time in the disk 60, the read command FUA is "1" (cache disabled), so that the read data of the disk 60 stored in cache memory 68 as a result of the read command of step S40 is ignored, and data is read directly from the magnetic disk 72. The DA 13 then judges whether a "good" response has been received from the disk 60, and if the response is "good", the DA 13 compares the read data P1 data for disk 60 in the work area of the cache memory 26 of the CM 10 with the read data P1 data from the disk 60. If the response is not "good", this fact is returned in the response to the CM 10; if the response is "good", then as the coordination request response, "good" is returned for comparison coincidence and "error" is returned for comparison non-coincidence to the CM 10.

(S56) The CM 10 judges whether a response to the coordination request has been received from the DA 13, and if a response has been received, decides whether the response is a "good" response. If not a "good" response, the response is a recovered error response, and processing advances to step S60.

(S58) If on the other hand the response from the disk 60 is "good", a decision is made as to whether the comparison result from the DA 13 is "good". If the comparison result is "good", the CM 10 issues then an assignment command to perform replacement processing of the relevant area on the disk 60, and write and verify commands for the replaced area to the disk 60 via the DA 13. The disk 60 executes the replacement processing for the area and performs the verify operation, and judges whether the replacement processing has been performed reliably. The data P1 data of the disk 60 staged in cache memory 26 is then transferred to the host, and processing ends.

(S60) If on the other hand the response is a "recovered error" response, or if the comparison result is "error", the CM 10 issues an assignment command to perform replacement processing of the area, and a write command for bad data (meaningless data; for example, null data) to the replaced area to the disk 60 via the DA 13. The disk 60 executes the replacement processing for the area, and writes the bad data to the replacement area. The CM 10 then notifies of the error to the host, and processing ends.

Thus when there is no redundancy, processing which is an extension of I/O processing is performed up to diagnostics and a response is issued to the cache, independently of the RAID level. That is, even upon the initial recovered read error, FUA (re-reading from the media) is enabled and a retry of a similar command (without division) is performed, and if no error occurs for the read command including retries, then the data is judged to be correct. Hence uncertain data (suspect data) occurring upon a recovered read error is restored through disk retries, and accurate read data can be transferred to the host.

Upon occurrence of a second recovered error, diagnostics are performed by comparing data re-read from the disk with the data of the error, and only when there is coincidence is the request disk judged to be normal, with the data transferred to the host. But because a recovered error has occurred once, there is the possibility that a recovered error may occur again, and so replacement processing is performed to prevent a repeated recovered error. Moreover, write and verify operations are performed, to guarantee reading and writing of the replacement-processed data.

When the comparison results in noncoincidence, because the system is not redundant, there is no advantage to detachment. Hence replacement processing is performed, bad data is written, the data is abandoned, and the host is notified of the error.

Other Embodiments

Figure 12:
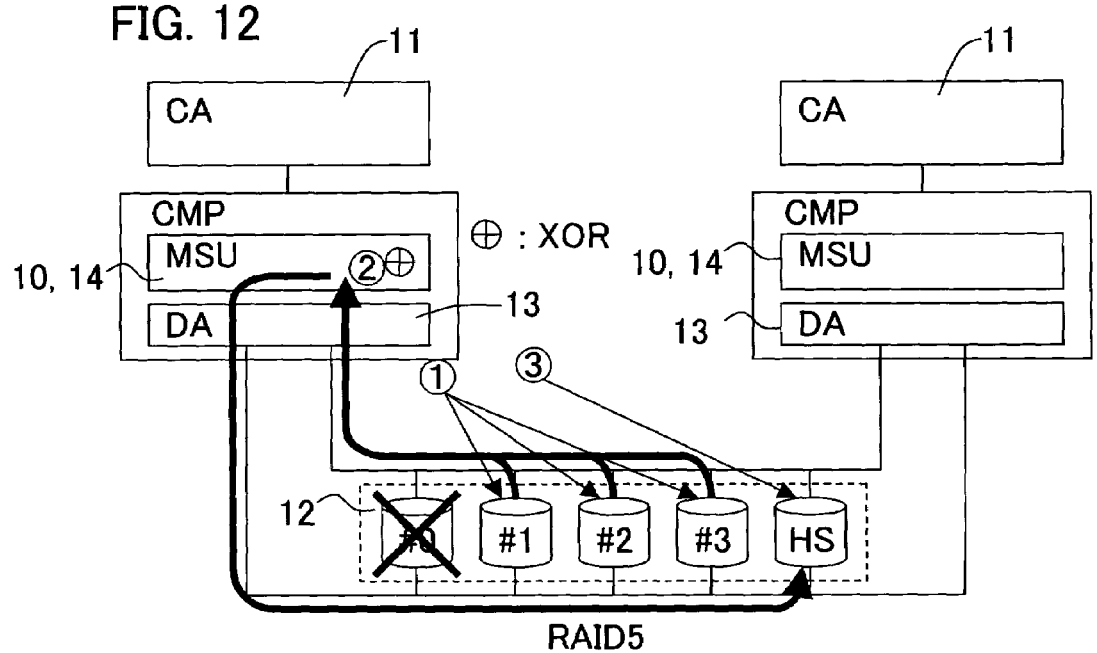
FIG. 12 explains the application to rebuild processing of the read access processing of the embodiment of FIG. 11.

FIG. 12 explains another embodiment of the invention; in this example, the recovered error processing for a non-redundant system of FIG. 9 through FIG. 11 is applied to a rebuild operation. In a rebuild operation, the data of a malfunctioning disk is restored, and is stored on a reserve or a new disk.

FIG. 12 shows the rebuild operation for a RAID 5 system; when disk #0 malfunctions, the data on disks #1 to #3 other than malfunctioning disk #0 is read to the cache memory 10, the XOR of these data sets is taken to create restored data, and the data is written to a reserve or new disk HS.

The rebuild operation is similar to the operation of FIG. 9 through FIG. 11; in the cases of a coordination error or a third recovered error, replacement processing is similarly performed and bad data is written, or RAID malfunction recovery is performed.

Figure 13:
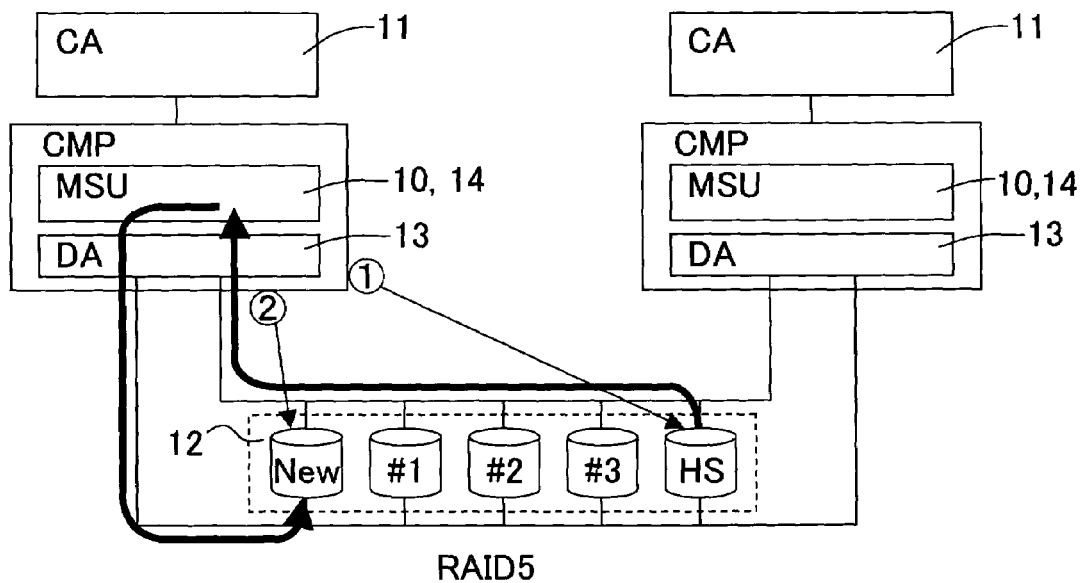
FIG. 13 explains the application to copy-back processing of the read access processing of the embodiment of FIG. 7; and, FIG. 14 explains the application to redundant copy processing of the read access processing of the embodiment of FIG. 7.
Figure 14:
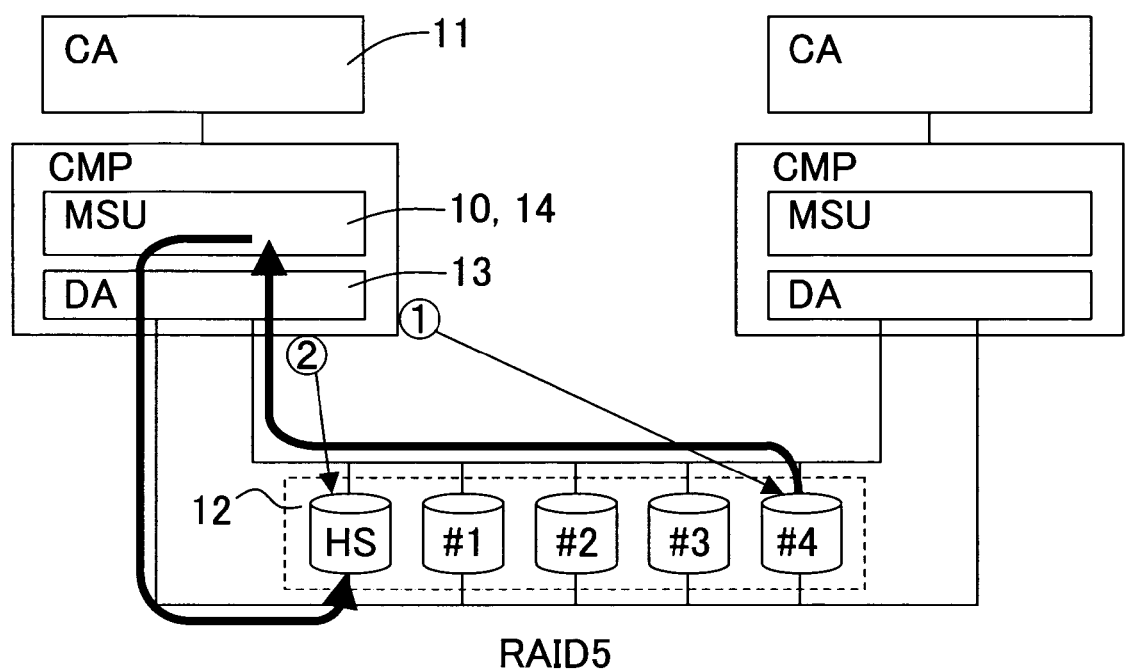

FIG. 13 and FIG. 14 explain other embodiments of the invention; in these examples, the recovered error processing for a redundant system of FIG. 5 through FIG. 8 is applied to copy-back operation (FIG. 13) and to redundant copying operation (FIG. 14). In copy-back operation, the disk data is stored in a copy disk.

FIG. 13 shows copy-back operation for a RAID 5 system; data on the disk HS is read to the cache memory 10, and is written to a new disk New. FIG. 14 shows redundant copying operation for a RAID 5 system; the data on disk #4 is read to the cache memory 10 and is then written to a reserve disk HS.

This copy-back and redundant copying operation is similar to the operation in FIG. 8, but the steps S24 to S28 in FIG. 6 are not necessary. In the case of a coordination error, the disk is detached, and the rebuild processing of FIG. 12 is begun.

This invention is not limited to the above-described aspects, and various modifications can be made without deviating from the gist of the invention. For example, in the above-described embodiments examples are explained of magnetic disk devices used as storage portions to hold data; but this invention is not limited thereto, and optical discs, magneto-optical discs, or other media may be used as the storage media of the storage portions. Further, the numbers of each of the component units (disk devices, host computers, control modules, cache managers, channel adapters, disk adapters, DMA engines), and the numbers of ports with which each of these units is provided, are not limited in this invention, and various appropriate modifications and combinations may be made as necessary.

Upon occurrence of an initial recovered read error, a retry is performed using a similar command, and if an error does not occur for the read command including retries, in order to judge the data as correct the uncertain data (suspect data) obtained at the time of the recovered error occurrence is restored by performing a disk retry, so that accurate data can be transferred to the host, contributing to improvement of the reliability of the storage system.

What is claimed is:

1. A storage system, comprising:
 a plurality of disk devices configured as a redundant system,
 a control unit which performs reading and writing of data from and to said each disk device according to requests from a higher-level apparatus, wherein said control unit comprises:
 a cache memory which stores data of each said disk device; and
 a processing unit which read-accesses each said disk device and receives read data and a response result from each said disk device, wherein said processing unit:

when the response to the read access of one of said disk devices is a recovered read error response, performs retry read access of same data on another of said disk devices constituting said redundant system, discriminates whether the response from said disk device accessed by said retry read does not include an error, and judges the read data obtained from said retry read access to be valid, and after executing said retry read access, performs read access of said one disk device with usage of the cache memory of said disk device disabled, receives read data, compares the read data with read data from said another disk device, and executes diagnostics of said one disk device.

2. The storage system according to claim 1, wherein, when said comparison result is satisfactory, said processing unit executes replacement processing of the relevant area of said one disk device.

3. The storage system according to claim 1, wherein, when said comparison result is not satisfactory, said processing unit executes detachment processing of said one disk device.

4. A storage system, comprising:

at least one disk device; and a control unit which performs reading and writing of data from and to said disk devices according to requests from a higher-level apparatus, wherein said control unit comprises:

a cache memory which stores data of said disk device; and a processing unit which read-accesses said disk device and receives read data and a response result from said disk device, wherein said processing unit:

when the response to the read access of one of said disk devices is a recovered read error response, performs retry read access of same data on said read-accessed disk device with usage of cache memory disabled, discriminates that the response from said disk device to said retry read access does not comprise an error, and judges the read data obtained by said retry read access to be valid, and in response to reception of a repeated recovered read error response from said retry read-accessed disk device, again performs retry read access of the same data on said read-accessed disk device with usage of cache memory disabled, discriminates that an error is not included, compares the read data with the read data obtained at the time of said recovered read error response, and executes diagnostics of said disk device.

5. The storage system according to claim 4, wherein, when said comparison result is satisfactory, said processing unit executes replacement processing of the relevant area of said disk device, and transfers said read data to an external apparatus.

6. The storage system according to claim 4, wherein, when said comparison result is not satisfactory, said processing unit executes replacement processing of the relevant area of said disk device, and notifies said external apparatus of an error.

7. A storage control device, which in response to a request from a higher-level apparatus performs reading and writing of data from and to at least one of a plurality of disk devices configured as a redundant system, comprising:

a cache memory which stores data of each said disk device; and a processing unit which read-accesses said disk device, and receives read data and a response result from said disk device, wherein said processing unit:

when the response to read access of one of said disk devices is a recovered read error response, performs retry read access of same data on another of said disk devices constituting said redundant system, and after executing said retry read access, performs read access of said one disk device with usage of the cache memory of said disk device disabled, receives read data, compares the read data with read data from said another disk device, and executes diagnostics of said one disk device.

8. The storage control device according to claim 7, wherein, when said comparison result is satisfactory, said processing unit executes replacement processing of the relevant area of said one disk device.

9. The storage control device according to claim 7, wherein, when said comparison result is not satisfactory, said processing unit executes detachment processing of said one disk device.

10. A storage control device, which in response to a request from a higher-level apparatus performs reading and writing of data from and disk devices, comprising:

a cache memory which stores data of said disk device; and a processing unit which read-accesses said disk device, and receives read data and a response result from said disk device, wherein said processing unit:

when said response upon receiving said read data is a recovered read error response, performs retry read access of same data on said read-accessed disk device with usage of cache memory disabled, discriminates that the response from said disk device to said retry read access does not comprise an error, and judges the read data obtained by said retry read access to be valid, and upon reception of a repeated recovered read error response from said retry read-accessed disk device, again performs retry read access of the same data on said read-accessed disk device with usage of cache memory disabled, discriminates that an error is not included, compares the read data with the read data obtained at the time of said recovered read error, and executes diagnostics of said disk device.

11. The storage control device according to claim 10, wherein, when said comparison result is satisfactory, said processing unit executes replacement processing of the relevant area of said disk device, and transfers said read data to an external apparatus.

12. The storage control device according to claim 10, wherein, when said comparison result is not satisfactory, said processing unit executes replacement processing of the relevant area of said disk device, and notifies said external apparatus of an error.

13. A storage control method for performing reading and writing of data from and to disk devices, in response to a request from a higher-level apparatus, comprising:

read-accessing said disk device, and receiving read data and a response result from said disk device;

performing retry read access of same data on another disk device when said response upon reception of said read data is a recovered read error response; and discriminating that the response from said disk device to said retry read access does not comprise an error, and judging the read data obtained by said retry read access to be valid, wherein said retry read access step comprises:

after execution of said retry read access, performing read access of said disk device with usage of cache memory of said disk device disabled;
receiving the read data; and
comparing the read data with the read data from said another disk device and of executing diagnostics of said disk device.

14. The storage control method according to claim 13, further comprising a step, when said comparison result is satisfactory, of executing replacement processing of the relevant area of said one disk device.

15. The storage control method according to claim 13, further comprising a step, when said comparison result is not satisfactory, of executing detachment processing of said one disk device.

16. The storage control method according to claim 13, wherein said retry read access step comprises a step, in response to said recovered read error response, of performing retry read access of the same data on said read-accessed disk device with usage of cache memory disable,
and said validity judgment step comprises:
a step of discriminating that the response from said disk device to said retry read access does not comprise an error; and
a step of judging the read data obtained by said retry read access to be valid.

17. A storage control method for performing reading and writing of data from and to disk devices, in response to a request from a higher-level apparatus, comprising:
read-accessing said disk device, and receiving read data and a response result from said disk device;
performing retry read access of the same data on said disk device when said response upon reception of said read data is a recovered read error response; and
discriminating that a response from said disk device to said retry read access does not comprise an error, and judging read data obtained by said retry read access to be valid, wherein said retry read access comprises:
in response to said recovered read error response, performing retry read access of the same data on said read-accessed disk device with usage of cache memory disable,
said validity judgment comprises:
discriminating that the response from said disk device to said retry read access does not comprise an error, and
judging the read data obtained by said retry read access to be valid;
again performing, in response to the reception of a repeated recovered read error response from said disk device of said retry read access, retry read access of the same data on said read-accessed disk device with usage of cache memory disabled; discriminating that an error is not included, and
comparing the read data with the read data obtained at the time of said recovered read error, and of executing diagnostics of said disk device.

18. The storage control method according to claim 17, further comprising:
a step, when said comparison result is satisfactory, of executing replacement processing of the relevant area of said disk device; and
a step of transferring said read data to an external apparatus.

19. The storage control method according to claim 17, further comprising:
a step, when said comparison result is not satisfactory, of executing replacement processing of the relevant area of said disk device; and
a step of notifying said external apparatus of an error.

* * * * *